US010876587B2

(12) United States Patent
Jang et al.

(10) Patent No.: US 10,876,587 B2
(45) Date of Patent: Dec. 29, 2020

(54) ACTUATOR ASSEMBLY WITH INTEGRATED HOUSING FOR ELECTROMECHANICAL PARKING BRAKE

(71) Applicant: KEYANG ELECTRIC MACHINERY CO., LTD., Seoul (KR)

(72) Inventors: Su Gil Jang, Cheonan-si (KR); Jang Soo Park, Suwon-si (KR); Min Kyu Kim, Incheon (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 35 days.

(21) Appl. No.: 16/368,036

(22) Filed: Mar. 28, 2019

(65) Prior Publication Data

US 2020/0309212 A1 Oct. 1, 2020

(51) Int. Cl.
| *F16D 65/18* | (2006.01) |
| *H02K 1/17* | (2006.01) |
| *H02K 7/102* | (2006.01) |
| *H02K 21/28* | (2006.01) |
| *H02K 7/116* | (2006.01) |

(Continued)

(52) U.S. Cl.
CPC ............... *F16D 65/18* (2013.01); *H02K 1/17* (2013.01); *H02K 7/102* (2013.01); *H02K 7/116* (2013.01); *H02K 21/28* (2013.01); *F16D 2121/24* (2013.01); *F16D 2125/50* (2013.01); *F16D 2250/0015* (2013.01)

(58) Field of Classification Search
CPC .... B60T 13/741; F16D 65/183; F16D 55/226; F16D 2121/24; F16D 2125/50; F16D 2250/0015; H02K 1/17; H02K 7/102; H02K 7/116; H02K 21/28

See application file for complete search history.

(56) References Cited

U.S. PATENT DOCUMENTS

| 7,021,415 B2 * | 4/2006 | Farmer ................. B60T 13/741 |
| | | 180/275 |
| 8,141,688 B2 * | 3/2012 | Matsushita ........... F16D 55/226 |
| | | 188/158 |

(Continued)

FOREIGN PATENT DOCUMENTS

| DE | 102008001539 A1 | 11/2009 |
| JP | 2018-185053 A | 11/2018 |

(Continued)

*Primary Examiner* — Vishal R Sahni
(74) *Attorney, Agent, or Firm* — Novick, Kim & Lee, PLLC; Jae Youn Kim

(57) ABSTRACT

Provided is an actuator assembly with an integrated housing for an electromechanical parking brake. The actuator assembly includes: a main housing having an integrated motor seat and an integrated gear set; a motor assembly disposed in the motor seat and providing torque; a gear assembly rotated by the torque from the motor assembly and performing a reduction function through a plurality of gears; a stator part constituting the motor assembly and at least partially formed on the inner side of the motor seat by insert injection molding; and a ring gear integrally formed with the gear seat or formed by insert injection molding and operating the gear assembly. The stator part of the motor assembly and the ring gear of the gear assembly are integrally formed with the main housing in the actuator assembly.

10 Claims, 6 Drawing Sheets

(51) Int. Cl.
*F16D 121/24* (2012.01)
*F16D 125/50* (2012.01)

(56) References Cited

U.S. PATENT DOCUMENTS

| | | | | |
|---|---|---|---|---|
| 8,790,208 | B2* | 7/2014 | Poertzgen | B60T 13/741 |
| | | | | 475/149 |
| 9,410,590 | B2* | 8/2016 | Jang | H02K 7/116 |
| 9,528,563 | B2* | 12/2016 | Balz | F16D 65/18 |
| 9,850,970 | B2* | 12/2017 | Ohlig | B60T 13/741 |
| 2007/0062769 | A1* | 3/2007 | Noh | B60T 13/588 |
| | | | | 188/265 |
| 2014/0159532 | A1* | 6/2014 | Kondou | H02K 1/27 |
| | | | | 310/156.53 |
| 2015/0330467 | A1* | 11/2015 | Bourlon | F16H 57/082 |
| | | | | 475/149 |
| 2016/0091039 | A1* | 3/2016 | Masuda | F16D 55/225 |
| | | | | 188/72.1 |
| 2018/0045258 | A1* | 2/2018 | Kimura | F16D 55/22 |

FOREIGN PATENT DOCUMENTS

| | | |
|---|---|---|
| KR | 10-1041553 B1 | 6/2011 |
| KR | 10-2013-0071256 A | 6/2013 |

\* cited by examiner

ACTUATOR ASSEMBLY WITH INTEGRATED HOUSING FOR ELECTROMECHANICAL PARKING BRAKE

BACKGROUND OF THE INVENTION

Field of the Invention

The present invention relates to an actuator assembly for operating an electromechanical parking brake and, more particularly, to an actuator assembly for an electromechanical parking brake in which a stator and a ring gear are integrated with a housing.

Description of the Related Art

An actuator for an automotive electromechanical parking brake is an apparatus for operating friction pads disposed on a caliper of a disc brake system for parking. The actuator is automatically operated when a user operates a switch for an electromechanical parking brake, and for this purpose, the actuator includes an electromechanical parking brake motor and a gear assembly (power transmission device) for transmitting power from the motor.

According to the way of using such an electromechanical parking brake, when a driver presses down a parking brake switch, torque of the motor of the actuator is transmitted to an input shaft of a caliper through a gear assembly (power transmission device) such as a reducer. The input shaft receiving the power is rotated, and accordingly, a pressing connection sleeve moves forward, and a piston and a caliper housing that accommodate the connection sleeve are moved close to each other by the forward movement of the sleeve. Further, two friction pads mounted on the piston and the caliper housing press both sides of a disc to prevent rotation, whereby parking is achieved.

Such an actuator is composed of several rotary parts and the rotary parts are rotated in mesh with each other, so tolerance management is important. When the distance between the centers of the rotary parts exceeds a permissible range due to accumulated tolerance between the parts, problems with quality such as performance deterioration or noise may be generated. In particular, vibration of a motor that is generated in operation causes shaking of the parts including gears and deteriorates durability of the gears due to the accumulated tolerance, thereby reducing durability of the resultant product.

This is because precise inter-shaft alignment is difficult when combining parts such as a motor and gears, and particularly, a gear assembly (or a gear box) for a reduction function is a separate part from a motor assembly, so inter-shaft alignment of parts spaced apart from each other is more difficult.

Further, since there are many parts in the actuator, more processes are required to assemble the parts, so the manufacturing time and manufacturing costs are also increased.

Documents of Related Art (Patent Document 1) Korean Patent No. 10-1041553
(Patent Document 2) Korean Patent Application Publication No. 10-2013-0071256

SUMMARY OF THE INVENTION

The present invention has been made in an effort to solve the problems in the related art and an object of the present invention is to improve convenience of assembly and inter-shaft alignment by integrating a stator of a motor assembly and a ring gear of a gear assembly with one housing in an actuator assembly including the motor and the gear assembly.

In order to achieve the objects of the present invention, an aspect of the present invention provides an actuator assembly with an integrated housing for an electromechanical parking brake, the actuator assembly including: a main housing having an integrated motor seat and an integrated gear set; a motor assembly disposed in the motor seat and providing torque; a gear assembly rotated by the torque from the motor assembly and performing a reduction function through a plurality of gears; a stator part constituting the motor assembly and at least partially formed on the inner side of the motor seat by insert injection molding; and a ring gear integrally formed with the gear seat or formed by insert injection molding and operating the gear assembly.

The stator part may include: a plurality of permanent magnets; and a yoke surrounding the permanent magnets, and the permanent magnets and the yoke may be at least partially integrated by insert injection molding when the main housing is molded.

The stator part may be formed by insert injection molding such that outer sides of the permanent magnets are not exposed, or an upper portion and a lower portion of the stator part may be formed by insert injection molding such that the outer sides of the permanent magnets are at least partially exposed.

The ring gear may be formed integrally around an inner side of the gear seat or may be separately manufactured and then integrated by insert injection molding when the main housing is molded, and planetary gears constituting the gear assembly may revolve in contact with an inner side of the ring gear.

The ring gear may be manufactured with relatively higher strength than the main housing and then integrated with the gear seat by insert injection molding.

A bearing supporting a lower portion of a motor shaft of the motor assembly may be integrally formed with the motor seat together with the stator part by insert injection molding.

The main housing may include: a frame part extending left and right; the motor seat formed at a side of the frame part and having the motor assembly in a first installation space defined therein; and the gear seat formed at another side of the frame part, opposite the motor seat, extending in parallel with the motor seat, and having the gear assembly in a second installation space defined therein.

An installation fence may protrude along an edge of the frame part and an idle gear connecting the motor assembly and the gear assembly to each other may be disposed in a space surrounded by the installation fence.

The actuator assembly with an integrated housing for an electromechanical parking brake according to the present invention has the following effects.

In the present invention, the motor assembly, the stator part, and the ring gear of the gear assembly are integrally formed with one main housing in the actuator assembly. Accordingly, several parts are aligned in one main housing, so inter-shaft alignment of the motor and the gears is improved and accordingly performance of a product is improved.

Further, since the stator part of the motor assembly is integrally formed with the main housing by insert injection molding and a gear box that was separately configured in the relate art is installed in the main housing, the assembly processes are reduced and a tolerance is more easily managed.

Further, the ring gear constituting the gear assembly is integrally formed with the gear assembly or integrated in the main housing by insert injection molding in the present invention, so it is possible to prevent torque that is provided through a resultant output shaft from shaking or from generating noise due to a tolerance issue.

Further, an installation fence protrudes from the main housing and an idle gear connecting the motor assembly and the gear assembly to each other is disposed in a space surrounded by the installation fence. Accordingly, all driving parts are disposed in the main housing in the present invention, so it is possible to manage an assembly tolerance through designing/producing of the main housing, so efficiency of management can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
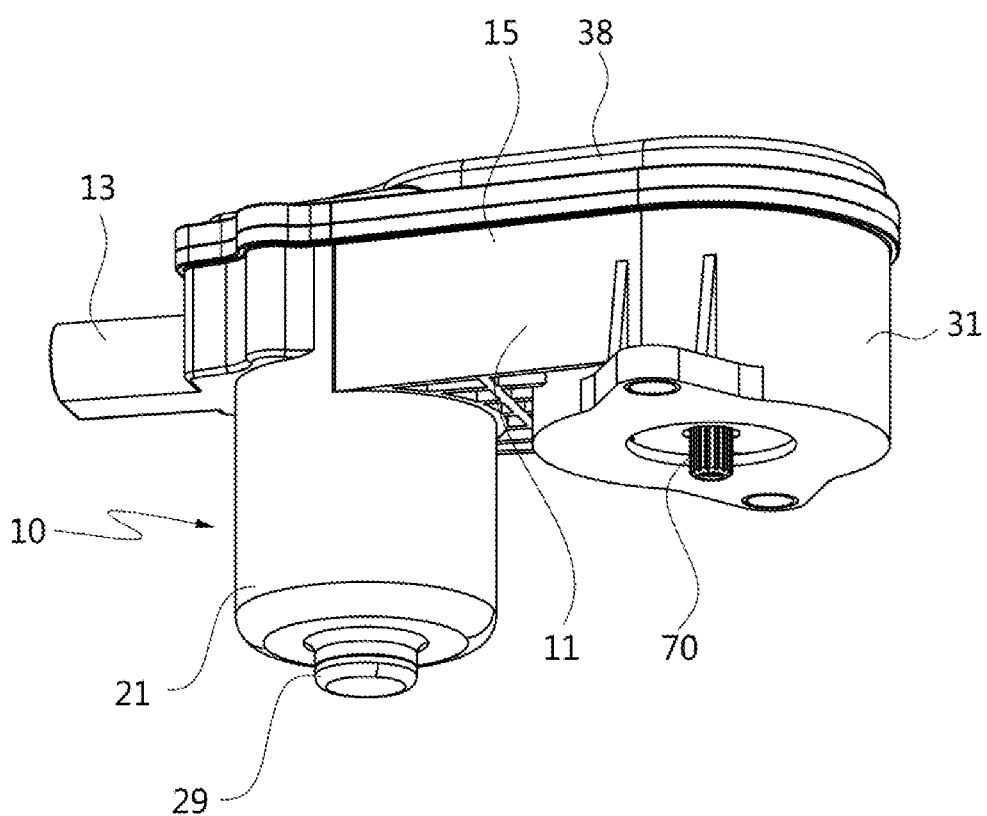
FIG. 1 is a perspective view showing an embodiment of an actuator assembly with an integrated housing for an electromechanical parking brake according to the present invention.

Hereinafter, some embodiments of the present invention are described in detail with exemplary drawings. It should be noted that when components are given reference numerals in the drawings, the same components are given the same reference numerals even if they are shown in different drawings. In the following description of embodiments of the present invention, when detailed description of well-known configurations or functions is determined as interfering with understanding of the embodiments of the present invention, they are not described in detail.

Terms 'first', 'second', 'A', 'B', '(a)', and '(b)' can be used in the following description of the components of embodiments of the present invention. The terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

An actuator assembly with an integrated housing for an electromechanical parking brake (hereafter, referred to as an 'actuator assembly') according to the present invention generates large torque by reducing rotation of a motor and transmits the torque to the outside to achieve the function of an electromechanical parking brake. To this end, a motor and a gear assembly are disposed in the actuator assembly of the present invention. The internal parts are largely classified into a motor assembly and a gear assembly for the convenience of description to be given hereafter.

Referring first to FIG. 1, the entire outer structure of an actuator assembly is formed by combining a main housing 10 and a cover 38. When the main housing 10 and the cover 18 are combined, a closed installation space is defined therein and several parts are disposed in the installation space to operate the actuator assembly. When the main housing 10 and the cover 18 are combined, as shown in the figure, only a connector socket 13 and an end of a resultant output shaft are exposed without the other parts exposed out of the installation space 15. A relative connector is inserted in a coupling space of the connector socket 13.

Figure 2:
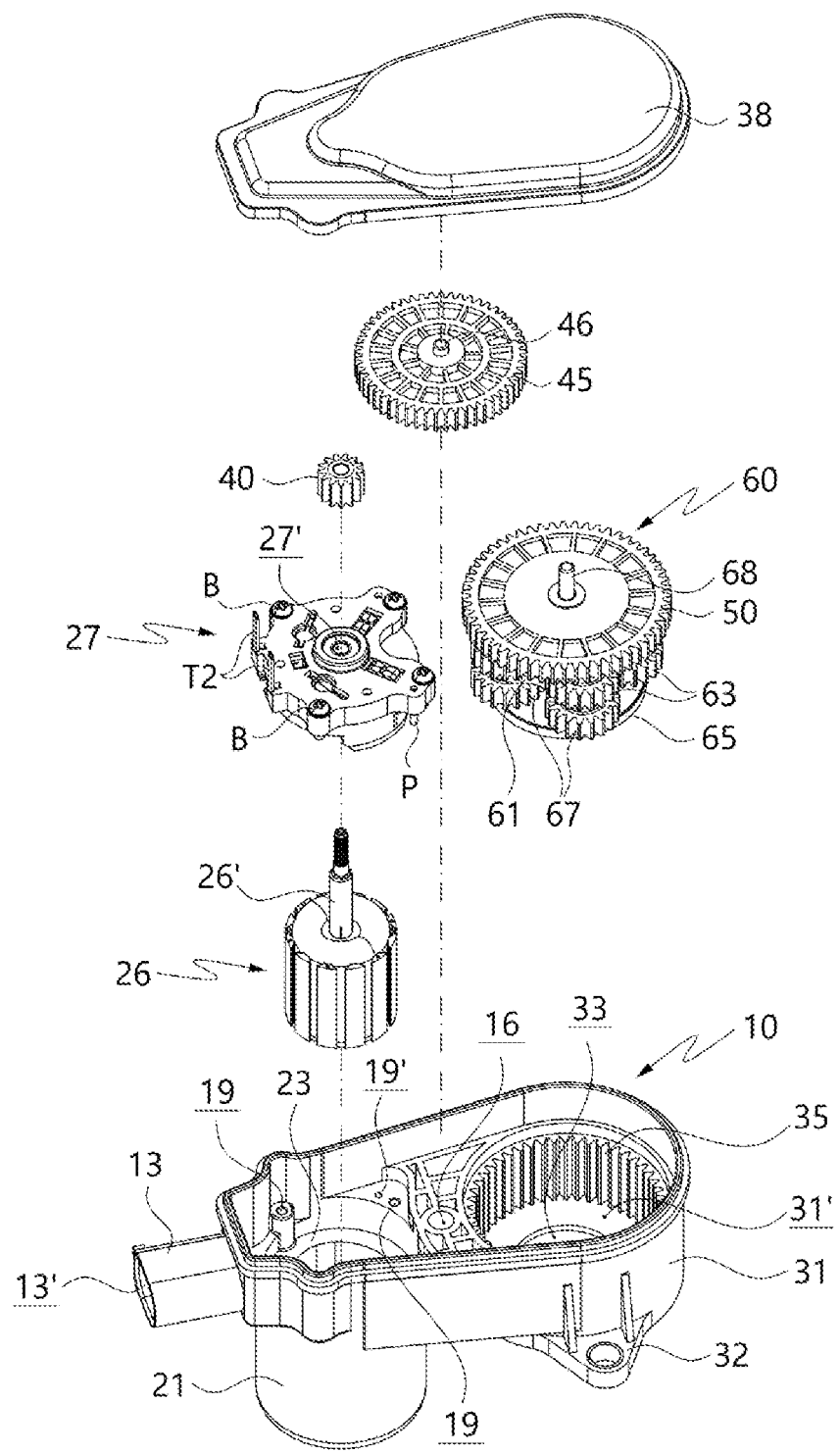
FIG. 2 is an exploded perspective view of the embodiment shown in FIG. 1.
Figure 3:
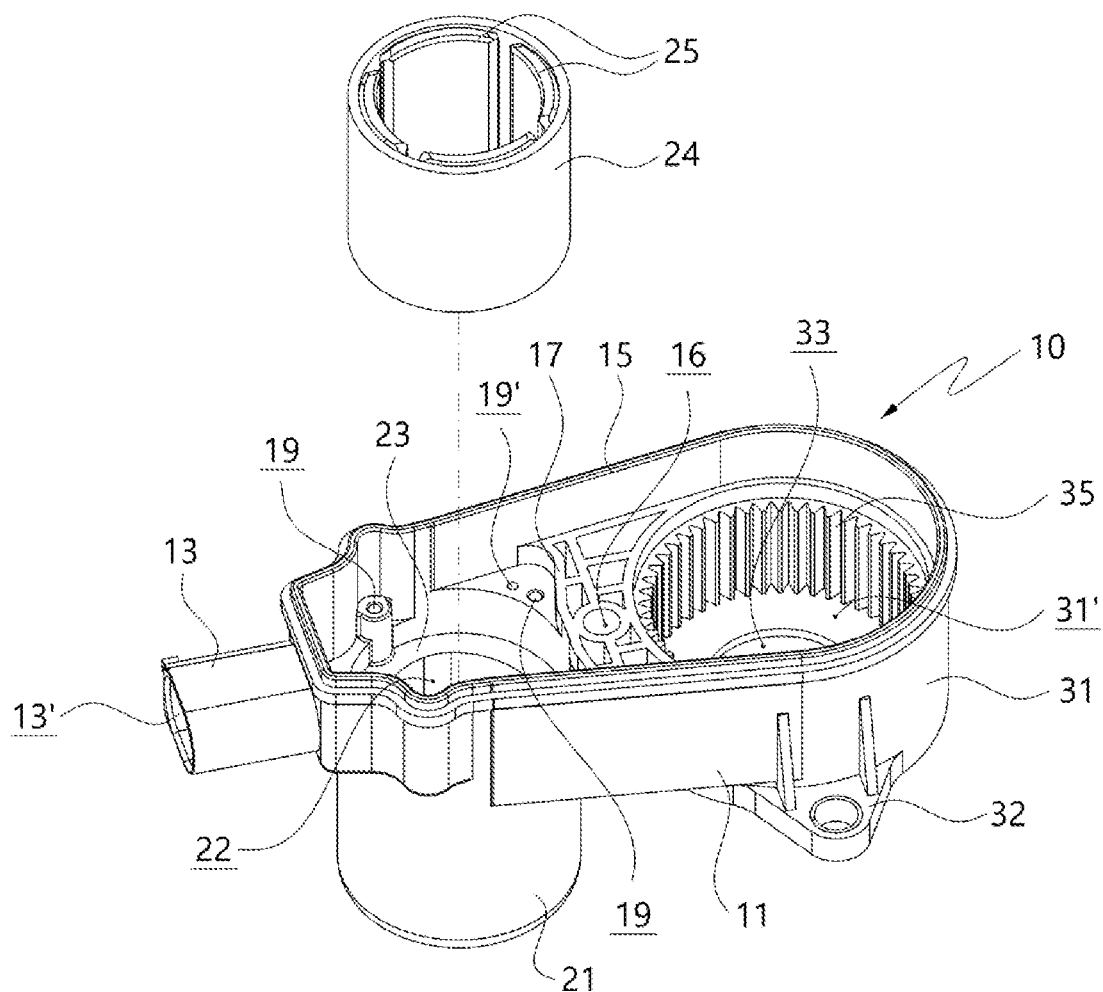
FIG. 3 is a perspective view showing the actuator assembly with a stator separated from a main housing according to an embodiment of the present invention.

In the configuration of the main housing 10, as shown in FIGS. 2 and 3, the main housing 10 has a motor assembly and a gear assembly therein. The motor assembly and the gear assembly are spaced apart from each other and respectively have rotary shafts that are parallel with each other. The main housing 10 is a single unit and is made of synthetic resin through injection molding in this embodiment.

The main housing 10 can be largely divided into three parts, which are a frame part 11, a motor seat 21 and the gear seat 31. The frame part 11, which is a part forming the fundamental structure, has a plate shape extending left and right in FIG. 3, and the motor seat 21 and the gear seat 31 are disposed respectively at both sides of the frame part 11. The connector socket 13 described above is formed close to the motor seat 21 and terminals T1 disposed in the connector socket 13 may be electrically connected in contact with motor terminals T2 of a brush card assembly 27 to be described below.

Referring to FIG. 3, the frame part 11 has an installation fence 15. The installation fence 15 is a portion protruding upward along the edge of the frame part 11 and a predetermined space is defined at the inside surrounded by the installation fence 15. An idle gear 45, a pinion gear 40 disposed at the upper portion of the motor assembly, and a drive gear 50 of the gear assembly are disposed in the space, which will be described below. The cover 38 is coupled to the outer side of the installation fence 15. Reference numeral '16' indicates a gear groove, and a rotary shaft 46 of the idle gear 45 is inserted in the gear groove 16.

The frame part 11 has a plurality of reinforcing ribs 17. The reinforcing ribs 17 increase the entire strength of the frame part 11, thereby being able to prevent the entire main housing 10 including the frame part 11 from deforming such as bending. In this embodiment, the reinforcing ribs 17 are formed only at the center portion of the frame part 11, but they are not limited thereto and may exist throughout the frame part 11.

Reference numeral '19' indicates holes in which bolts B that are fasteners are fastened. When the bolts B are fastened in the fastening grooves 19, the brush card assembly 27 can be fixed to the main housing 10. A guide hole 19' is formed close to the fastening grooves 19 at the frame part 11. The guide hole 19' is a hole extending up and down in the installation direction of the brush card assembly 27 and a guide pin P of the brush card assembly 27 is fitted in the guide hole. When the guide pin P is fitted in the guide hole 19', the brush card assembly 17 can be accurately guided in the installation direction. That is, when the guide pin P is fitted in the guide hole 19' even before the bolts B are fastened in the fastening groove 19, the brush card assembly 27 can be accurately guided in the installation direction. The guide pin P may be formed integrally with the brush card assembly 27 or may be separately manufactured and then combined with the brush card assembly 27.

A motor assembly is disposed on the frame part 11. The motor seat 21 is a part extending perpendicular to the frame part 11 and the motor assembly is disposed in the motor seat 21. The motor seat 21 has a first installation space 22 extending up and down therein and the first installation space 22 has a substantially cylindrical shape. A stator part 24 and 25 is disposed in the first installation space 22 and the motor assembly is disposed at the center. The motor seat 21 has an open top and the motor assembly can be installed through the open top.

The stator part 24 and 25 is disposed in the first installation space 22 of the motor seat 21. The stator part 24 and 25 provides magnetic force for rotating an armature core 26 to be described below. The stator part 24 and 25 is disposed on the inner side of the first installation space 22 and is composed of a permanent magnet 25 and a yoke 24. A plurality of permanent magnets 25 is provided and the yoke 24 may be a cylinder surrounding the permanent magnets 25. The permanent magnets 25 may be fixed to the yoke 24 by bonding.

The stator part 24 and 25 is formed in the motor seat 21 by insert injection molding.

The stator part 24 and 25 is integrally formed at the portion that becomes the motor seat 21 when the main housing 10 including the motor seat 21 is formed by injection molding. Accordingly, the stator part 24 and 25 is combined with the motor seat 21 not to be separated, and for reference, the stator part 24 and 25 shown separately in FIG. 3 is only to help understanding.

Figure 4:
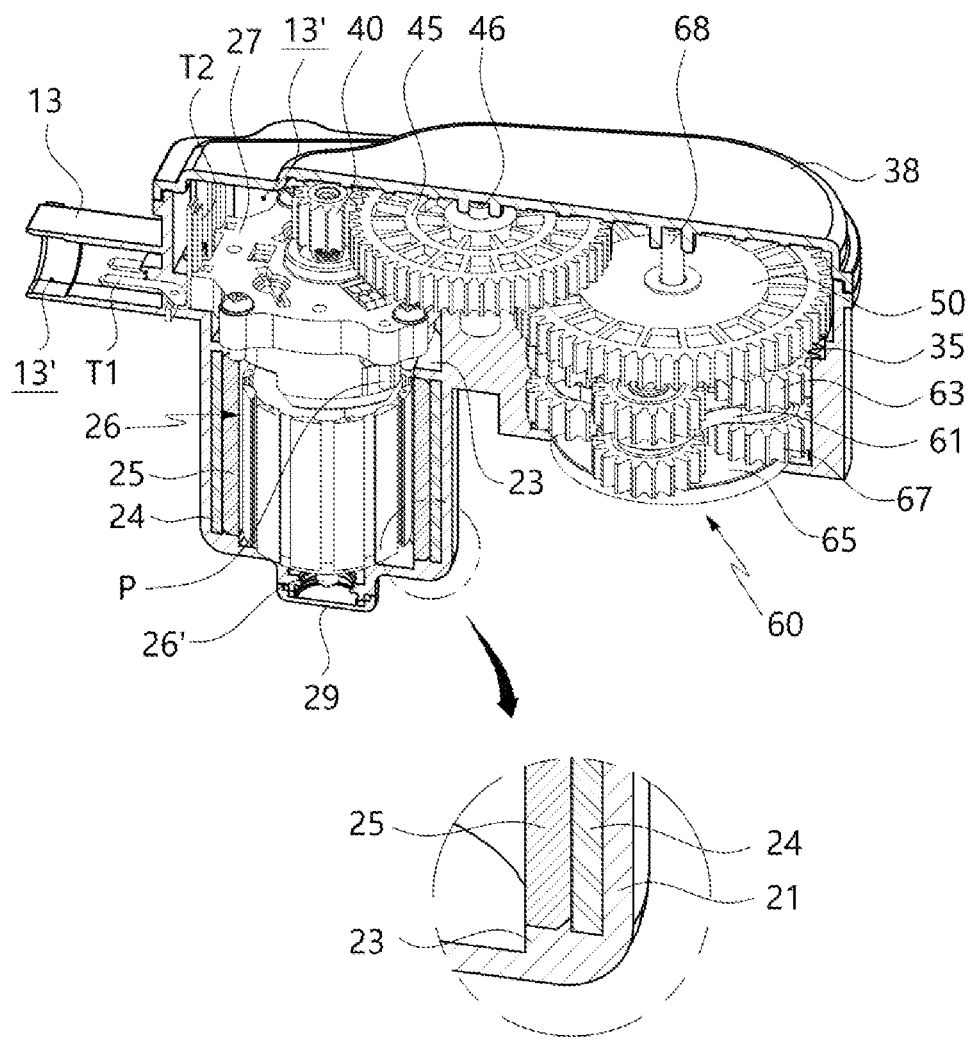
FIG. 4 is a perspective view showing the internal structure of FIG. 1 by partially cutting the main housing and a cover.

The stator part 24 and 25 is at least partially fixed to the motor seat 21 by insert injection molding that is a different-material composite forming technique. Referring to FIG. 4, it can be seen that the permanent magnets 25 and the yoke 24 of the stator part 24 and 25 are integrated with the motor seat 21, in which the motor seat 21 may be configured to fully cover the permanent magnets 25 up to the fronts of the permanent magnets 25 or may be formed to cover only portions of the permanent magnets 25. However, at least the upper portion and lower portion of the stator part 24 and 25 may be fixed by injection molding with the motor seat 21. A reference numeral '23' indicates a portion that covers the stator part 24 and 25 in insert injection molding and the portion becomes an over-molding portion when molding is finished.

Figure 5:
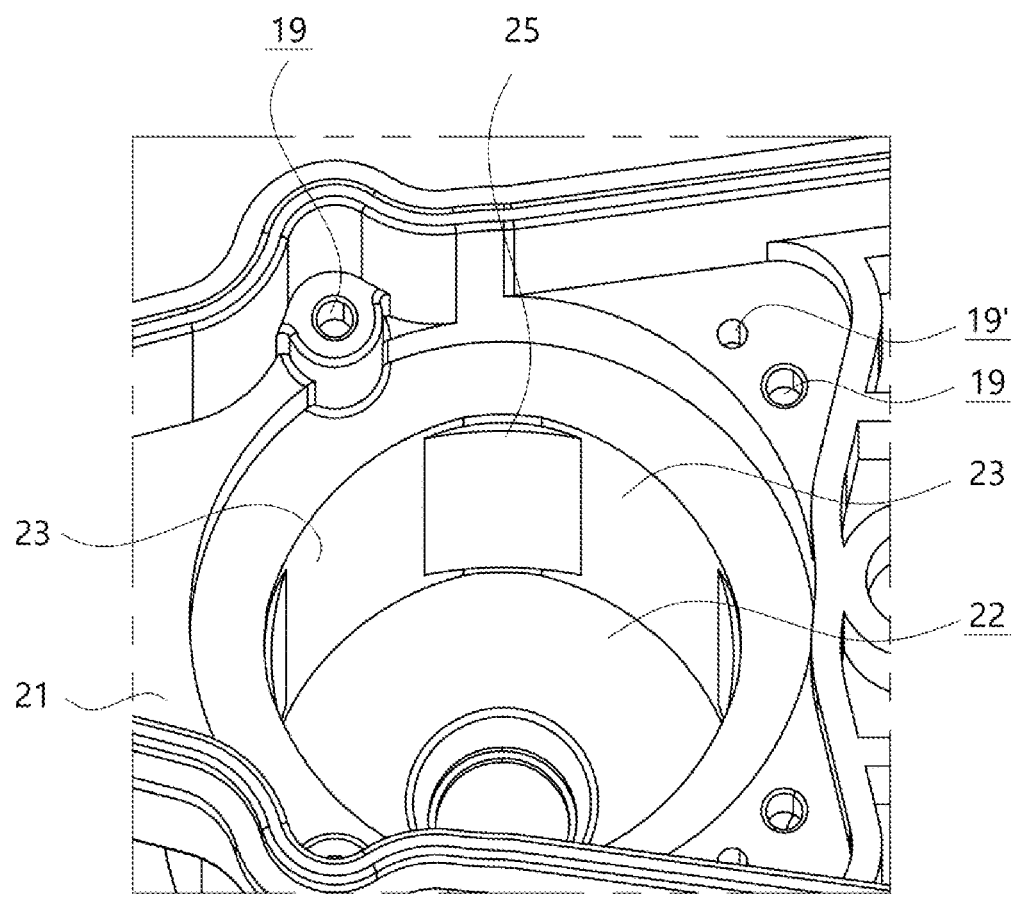
FIG. 5 is a perspective view showing in detail a stator part installed in a motor seat constituting the embodiment of FIG. 1.

Referring to FIG. 5, it can be seen that the stator part 24 and 25 is installed in the motor seat 21. As shown in the figure, the yoke 24 of the stator part 24 and 25 is disposed and completely covered by the over-molding portion 23 of the motor seat 21, but the permanents magnets 25 are partially exposed. More accurately, both edges of the permanent magnets 25 are embedded in the over-molding portion 23 in the motor seat 21, but the center portions of the permanent magnets 25 are exposed. Accordingly, the magnetic force of the permanent magnets 25 can be sufficiently transmitted to the armature core 26. That is, the permanent magnets 25 are firmly fixed by the over-molding portion 23, but deterioration of the function of the permanent magnets 25 can be prevented by the over-molding portion 23.

Figure 6:
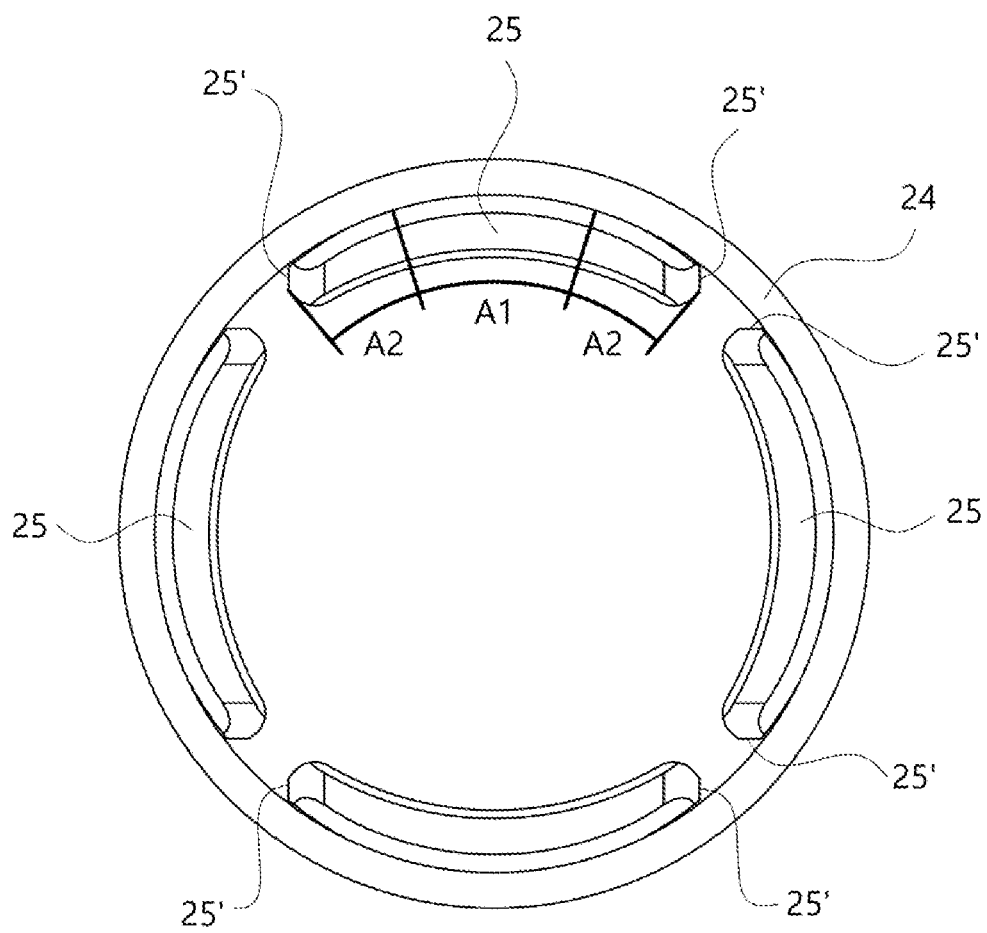
FIG. 6 is a plan view showing the stator part constituting the embodiment of FIG. 1.

The stator part 24 and 25 is shown well in FIG. 6. Referring to this figure, inclined portions 25' are formed at both side ends of the permanent magnets 25 of the stator part 24 and 25 and each have a shape recessed such that the width decreases toward the yoke 24. The inclined portions 25' are portions covered with the over-molding portion 23, so the permanent magnets 25 can be firmly fixed.

Referring to FIG. 6, the center portions A1 of the permanent magnets 25 are portions that are exposed without being covered by the over-molding portion 23 and built-in portions A1 at both sides are portions that are covered and embedded by the over-molding portion 23. The inclined portions 25' of the permanent magnets 25 described above are portions of the built-in portions A2, so they are portions that are covered by the over-molding portion 23.

As described above, since the stator part 24 and 25 is formed when the motor seat 21 is formed by molding, there is no separate assembly process for the stator part 24 and 25 and an assembly error that may be generated in an assembly process can be reduced. Though not shown in the figures, a bearing that supports a motor shaft 26' that is the rotational center of the motor may also be formed at the motor seat 21 by insert injection molding. The bearing is disposed at the lower end of the motor shaft 26'.

Referring to FIG. 2, the armature core 26 and the motor shaft 26' of the motor assembly are inserted in the first installation space 22. The armature core 26 constitutes the motor assembly together with the stator part 24 and 25 and a coil is wound around the armature core 26. Power is applied to the coil through the brush card assembly 27 and a rectifier (not shown) changes the direction of a current flowing through the coil. The armature core 26 is 3-dimensinally formed by stacking a plurality of core plates and has a substantially cylindrical shape.

The brush card assembly 27 is disposed over the first installation space 22. An end of the motor shaft 26' is exposed upward through a through-hole 27' of the brush card assembly 27 and the pinion gear 40 is coupled to the exposed portion, thereby transmitting torque to the gear assembly. The brush card assembly 27 has the motor terminals T2. External power can be supplied through the motor terminal T2. The motor terminals T2 are connected to the terminals T1 of the connector socket 13, so when a current is applied through the relative connector from the outside, the motor assembly is operated and the motor shaft 26' is rotated. A yoke cover 29 is disposed under the first installation space 22, thereby covering the lower portion.

The pinion gear 40 is connected to the motor shaft 26'. The pinion gear 40 transmits driving force from the motor to the gear assembly while rotating with the motor shaft 26'. More accurately, the idle gear 45 is disposed between the pinion gear 40 and the gear assembly, so primary reduction is performed. The idle gear 45 and the drive gear 50 of the gear assembly are engaged with each other, so the pinion gear 40 and the drive gear 50 rotate in the same direction. As described above, the idle gear 45 is rotated with the rotary shaft thereof inserted in the gear groove 16 of the frame part 11.

The main housing 10 has the gear seat 31. The gear seat 31 is a part where the gear assembly is assembled, and is spaced apart from the motor seat 21. The gear seat 31 has a second installation space 31' and a plurality of gears constituting the gear assembly is installed in the second installation space 31'. A hole is formed through the bottom of the gear seat 31, so a resultant output shaft 70 can protrude through the hole.

Referring to the gear seat 31, a fastening flange 32 is formed on a side of the gear seat 31. The fastening flange 32 is a portion for mounting the actuator assembly of the present invention in a vehicle and has a through-hole at the center. A fastener (not shown) such as a bolt is disposed through the fastening hole of the fastening flange 32. A plurality of fastening flanges 32 may be provided.

A ring gear 35 is disposed on the inner side of the second installation space 31' of the gear seat 31. The ring gear 35, which revolves first planetary gears 63 and second planetary gears 67 of a planetary gear assembly 60 to be described below, is formed integrally with the gear seat 31 or is formed by insert injection molding. Although the ring gear 35 is integrally formed around the inner side of the gear seat 31 in this embodiment, it may be manufactured separately and then integrated with the main housing 10 by insert injection molding when the main housing 10 is formed by molding. The space surrounded by the ring gear 35 is the second installation space 31'.

For example, the ring gear 35 may be manufactured separately with strength relatively higher than the main housing 10 and then integrated with the gear seat 31 by insert injection molding. In this case, the ring gear 35 may be made of a material having high strength such as metal or reinforced plastic. As described above, since the ring gear 35 is formed when the gear seat 31 is formed by molding, there is no separate assembly process for the ring gear 35 and an assembly error that may be generated in an assembly process can be reduced.

The gear assembly 31 is assembled in the gear seat 31. The gear assembly is formed by combining a plurality of gears and may be considered as being largely composed of the drive gear 50 and the planetary gear assembly 60. The planetary gear assembly 60 includes a first carrier 61 and a second carrier 65, a plurality of first planetary gears 63 is disposed on the first carrier 61, and a plurality of second planetary gears 67 is disposed on the second carrier 65. The drive gear 50 that transmits torque from the gears is disposed over them and rotated in mesh with the idle gear 45.

The first carrier 61 and the first planetary gears 63 perform secondary reduction and the second carrier 65 and the second planetary gears 67 disposed under the first carrier and first planetary gear perform third reduction. Power is output to the outside through the resultant rotary shaft 70 connected to the second carrier 65. According to the structure of the gear assembly, in detail, the planetary gear assembly 60 is disposed and rotated in the second installation space 31' that is an internal space surrounded by the ring gear 35, and the first planetary gears 63 are rotatably coupled to the first carrier 61. In this embodiment, a total of four first planetary gears 63 may be provided and they can independently rotate. The second carrier 65 and the second planetary gears 67 have the same configuration as the first carrier 61 and the first planetary gears 63 and are disposed under them.

A center pin 68 is disposed at the center of the first carrier 61 as the rotational center of the first carrier 61. The center pin 68 is partially exposed upward through a center hole of the drive gear 50. Accordingly, the center pin 68 also functions as a rotary shaft of the drive gear 50.

The first planetary gears 63 are rotated in mesh with each other around a sun gear (not shown) of the drive gear 50. The sun gear protrudes downward from the drive gear 50, is integrated with the drive gear 50, and rotates with the drive gear 50. The first planetary gears 63 rotating with the sun gear not only can rotate at the position, but can revolve in mesh with the ring gear 35 disposed outside them. The first planetary gears 63, which revolve as described above, rotate the first carrier 61, so the resultant output shaft 70 under the first carrier 61 rotates. Since the second carrier 65 and the second planetary gears 67 have the same structure, they perform reduction while rotating together.

Obviously, the gear assembly is not necessarily limited to this structure. For example, the gear assembly may include only the first carrier 61 and the first planetary gears 63 without the second carrier 65 and the second planetary gears 67.

Next, a process of manufacturing the actuator assembly with an integrated housing for an electromechanical parking brake according to the present invention is described.

First, the main housing 10 is formed by molding, and in this process, the stator part 24 and 25 is also formed by injection molding. The stator part 24 and 25 is molded with the main housing 10 with the permanent magnets 25 bonded to the yoke 24, and is fixed by over-molding when the motor seat 21 of the main housing 10 is molded. Accordingly, there is no need for a worker to assemble the stator parts 24 and 25 through a post-process and the stator part 24 and 25 is firmly fixed to the motor seat 21 by the over-molding portion 23, so an assembly error can be considerably reduced.

The ring gear 35 is also integrally formed when the main housing 10 is molded. In this embodiment, the ring gear 35 is formed integrally around the inner side of the gear seat 31. Obviously, as described above, the ring gear 35 may be separately manufactured and then integrated by inserting injection molding when the main housing 10 is molded.

As a result, the main housing 10 is a single part but may include both of the motor seat 21 and the gear seat 31 and the ring gear 35 and the stator part 24 and 25 are integrally formed in the manufacturing process, so the number of processes can be remarkably reduced and a tolerance is more easily managed.

In this state, the motor assembly and the gear assembly are installed in the main housing 10. First, the armature core 26 of the motor assembly is put into the first installation space 22 and then the brush card assembly 27 is assembled over the armature core 26. The pinion gear 40 is coupled to the upper end of the motor shaft 26' of the motor assembly. It may also be formed to electrically connect the motor terminals T2 of the brush card assembly 27 and the terminals T1 of the connector socket 13 through welding.

The gear assembly is put into the second installation space 31' and the idle gear 45 is installed between the pinion gear 40 and the drive gear 50. Finally, the cover 30 is combined with the main housing 10, thereby finishing assembly. As described above, several parts are aligned in one main housing 10, so axial alignment of a motor and gears can be improved.

Even if all components of the embodiments of the present invention were described as being combined in a single unit or operated in combination with each other, the present invention is not limited to the embodiments. That is, the all components may be selectively combined and operated within the scope of the present invention. Further, the terms "comprise", "include", "have", etc. when used in this specification mean that the components can exist inside unless specifically stated otherwise, so they should be construed as being able to further include other components. Unless otherwise defined, all terms including technical and scientific terms used herein have the same meaning as commonly understood by those skilled in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description merely explains the spirit of the present invention and the present invention may be changed and modified in various ways without departing from the spirit of the present invention by those skilled in the art. Accordingly, the embodiments described herein are provided merely not to limit, but to explain the spirit of the present invention, and the spirit of the present invention is not limited by the embodiments. The protective range of the present invention should be construed by the following claims and the scope and spirit of the invention should be construed as being included in the patent right of the present invention.

What is claimed is:

1. An actuator assembly with an integrated housing for an electromechanical parking brake, the actuator assembly comprising:
   a main housing having an integrated motor seat and an integrated gear seat;
   a motor assembly disposed in the integrated motor seat, including a stator part and providing torque;
   a gear assembly rotated by the torque from the motor assembly and performing a reduction function through a plurality of gears; and
   a ring gear integrally formed with the gear seat and operating the gear assembly,
   wherein the stator part is integrally fixed to an inner side of the integrated motor seat and includes:
   a plurality of permanent magnets; and
   a yoke surrounding the permanent magnets,
   wherein each of the permanent magnets and the yoke have the same length,
   wherein a lower portion of each of the permanent magnets and a lower portion of the yoke are integrally fixed to a lower portion of the integrated motor seat, and
   wherein an upper portion of each of the permanent magnets and an upper portion of the yoke are integrally fixed to an upper portion of the integrated motor seat.

2. The actuator assembly of claim 1, wherein outer sides of the permanent magnets are not exposed, or the outer sides of the permanent magnets are at least partially exposed.

3. The actuator assembly of claim 1, wherein the ring gear is formed integrally around an inner side of the gear seat, and planetary gears of the gear assembly revolve in contact with an inner side of the ring gear.

4. The actuator assembly of claim 3, wherein the ring gear has a relatively higher strength than the main housing and is integrated with the gear seat.

5. The actuator assembly of claim 1, wherein a bearing supporting a lower portion of a motor shaft of the motor assembly is integrally formed with the integrated motor seat together with the stator part.

6. The actuator assembly of claim 1, wherein the main housing includes:
   a frame part extending left and right;
   the integrated motor seat formed at a side of the frame part and having the motor assembly in a first installation space defined therein; and
   the gear seat formed at another side of the frame part, opposite to the integrated motor seat, extending in parallel with the integrated motor seat, and having the gear assembly in a second installation space defined therein.

7. The actuator assembly of claim 6, wherein an installation fence protrudes along an edge of the frame part and an idle gear connecting the motor assembly and the gear assembly to each other is disposed in a space surrounded by the installation fence.

8. The actuator assembly of claim 6, wherein a guide hole is formed at the frame part and a guide pin of a brush card assembly is inserted in the guide hole, so an assembly position of the brush card assembly can be set.

9. The actuator assembly of claim 1, wherein portions of both sides of each of permanent magnets are embedded in the integrated motor seat and portions of centers of the permanent magnets are exposed to face an armature core.

10. The actuator assembly of claim 9, wherein each of the permanent magnets has inclined portions formed at both edges of each of the permanent magnets and embedded in the motor seat, and a width of each of the inclined portions decreases toward the yoke.

* * * * *